United States Patent
Takeuchi et al.

(10) Patent No.: US 11,043,825 B2
(45) Date of Patent: Jun. 22, 2021

(54) POWER SUPPLY DEVICE

(71) Applicant: SANYO Electric Co., Ltd., Daito (JP)

(72) Inventors: Motoji Takeuchi, Osaka (JP); Yusuke Omote, Kanagawa (JP); Takuya Hirota, Kanagawa (JP); Hisashi Kameyama, Osaka (JP); Jeewook Chang, Osaka (JP); Mitsuhiro Hamada, Kanagawa (JP)

(73) Assignee: SANYO Electric Co., Ltd., Daito (JP)

( * ) Notice: Subject to any disclaimer, the term of this patent is extended or adjusted under 35 U.S.C. 154(b) by 246 days.

(21) Appl. No.: 16/343,859

(22) PCT Filed: Oct. 12, 2017

(86) PCT No.: PCT/JP2017/036942
§ 371 (c)(1),
(2) Date: Apr. 22, 2019

(87) PCT Pub. No.: WO2018/079276
PCT Pub. Date: May 3, 2018

(65) Prior Publication Data
US 2019/0245359 A1    Aug. 8, 2019

(30) Foreign Application Priority Data
Oct. 28, 2016    (JP) .............................. JP2016-212329

(51) Int. Cl.
*H02J 7/00* (2006.01)
*H02H 11/00* (2006.01)
(Continued)

(52) U.S. Cl.
CPC .............. *H02J 7/0026* (2013.01); *G05F 1/10* (2013.01); *H01M 10/42* (2013.01); *H02H 7/18* (2013.01);
(Continued)

(58) Field of Classification Search
CPC ................................. H02J 7/00; H02J 7/0029
See application file for complete search history.

(56) References Cited

U.S. PATENT DOCUMENTS

| | | | |
|---|---|---|---|
| 5,705,911 A | 1/1998 | Tamai | |
| 2017/0033551 A1* | 2/2017 | Kim | ......................... H02H 3/20 |

FOREIGN PATENT DOCUMENTS

| | | | |
|---|---|---|---|
| JP | 5-241570 A | 9/1993 | |
| JP | 9-163612 A | 6/1997 | |

(Continued)

OTHER PUBLICATIONS

International Search Report dated Dec. 19, 2017, issued in counterpart International Application No. PCT/JP2017/036942 (1 page).
(Continued)

*Primary Examiner* — Robert Grant
(74) *Attorney, Agent, or Firm* — Westerman, Hattori, Daniels & Adrian, LLP

(57) ABSTRACT

A power supply device includes a spike absorption circuit that suppresses an avalanche breakage of a current shutdown switch due to a kickback voltage that may appear in response to the cut-off of a load current. The current shutdown switch is connected to secondary batteries. The spike absorption circuit is a series circuit of a protection switch, formed of a semiconductor element, and a diode. The power supply device further includes: a small-signal switch that controls turn-on and turn-off of the protection switch; and a delay circuit that maintains the small-signal switch in an ON state over a setup time after a current shutdown timing of the current shutdown switch. The delay circuit maintains the small-signal switch in the ON state over the setup time (T), and the small-signal switch thereby causes the protection switch to the ON state. Then, the spike absorption circuit damps the kickback voltage.

9 Claims, 3 Drawing Sheets

(51) Int. Cl.
    *H01M 10/42*     (2006.01)
    *G05F 1/10*     (2006.01)
    *H02H 9/00*     (2006.01)
    *H02H 7/18*     (2006.01)

(52) U.S. Cl.
    CPC .......... *H02H 9/005* (2013.01); *H02H 11/002* (2013.01); *H02J 7/00* (2013.01); *H02J 7/00304* (2020.01)

(56) References Cited

FOREIGN PATENT DOCUMENTS

| | | |
|---|---|---|
| JP | 2003-143751 A | 5/2003 |
| JP | 2009-177937 | 8/2009 |
| WO | 2016/032522 A1 | 3/2016 |

OTHER PUBLICATIONS

The Extended (Supplementary) European Search Report dated Aug. 6, 2019, issued in counterpart EP application No. 17865854.8. (9 pages).

* cited by examiner

POWER SUPPLY DEVICE

TECHNICAL FIELD

The present invention relates to a power supply device that includes: a plurality of secondary batteries; and a current shutdown switch connected to an output side of the secondary batteries, the current shutdown switch being configured to cut off a load current. More specifically, the present invention relates to a power supply device that, even when a current shutdown switch is switched to an OFF state while a large current is being supplied to a load or while a large current is flowing through a short-circuited load, suppresses an avalanche breakage of the current shutdown switch due to a kickback voltage that may appear in response to the switching.

BACKGROUND ART

Power supply devices are equipped with a current shutdown switch that suppresses overcharge and over-discharge of secondary batteries. This current shutdown switch cuts off a current when an overcurrent flows or a battery temperature exceeds a setup temperature. The current shutdown switch is connected to an output side of the secondary batteries and cuts off a charge current or a load current. As the current shutdown switch, a semiconductor element such as a field effect transistor (FET) is used (refer to PTL 1 and PTL 2).

CITATION LIST

Patent Literature

PTL 1: Unexamined Japanese Patent Publication No. H09-163612
PTL 2: Unexamined Japanese Patent Publication No. 2009-177937

SUMMARY OF THE INVENTION

In the battery pack described in PTL 1 and PTL 2, the output side of the secondary batteries is connected in series to both a charge switch and a discharge switch in order to suppress overcharge and over-discharge of the secondary batteries. When the battery pack with this circuit configuration is connected to an inductive load, if a current flowing through this inductive load is cut off, a kickback voltage appears. This kickback voltage appears in response to a variation in a current flowing through inductance contained in the load. The kickback voltage is expressed by the following theoretical formula:

(kickback voltage)=(inductance of load)×$di/dt$.

Kickback energy generated in this case increases in proportional to the product of the inductance of the load and the square of the current. The kickback voltage increases rapidly in proportional to a variation rate of the load current. Thus, when a large load current is cut off in a power supply device, a considerably high voltage may be momentarily applied to a current shutdown switch. If the kickback voltage exceeds the maximum allowable reverse voltage of the current shutdown switch, an avalanche breakdown occurs in the current shutdown switch. This avalanche breakdown may generate a large amount of kickback energy, which might cause an avalanche breakage of the current shutdown switch. Although not all power supply devices are connected to inductive loads, inductive loads may be difficult to completely eliminate, because even a wire connected to a power supply device may contain some inductance. As a longer wire is connected to the load, its inductance increases, in which case a potential kickback voltage and kickback energy also increase. In a power supply device, a kickback voltage appears at the moment when a current shutdown switch is switched to an OFF state. This kickback voltage may increase a potential risk of an avalanche breakage of the current shutdown switch. Since a power supply device is used in various applications, inductance of a load and a current flowing through the load may depend on its application. When a load containing great inductance is connected to a power supply device and a large current is supplied to the load, for example, due to the short circuit of the terminals, a high kickback voltage may appear. It is therefore very important for power supply devices intended to be safely used in various applications to reliably suppress an avalanche breakage of a current shutdown switch due to a kickback voltage.

By connecting a diode in the reverse direction to an output side of a current shutdown switch, an avalanche breakage of the current shutdown switch due to a kickback voltage can be absorbed. Since the kickback voltage is reverse to an output voltage, the diode and a circuit at the output side constitute a single closed circuit. However, if a charger is reversely connected to a power supply device with this circuit configuration, a large short-circuit current may flow through the diode. This means that it is difficult to ensure safety if a charger is reversely connected. By connecting in series a spike absorption circuit including a fuse or a positive temperature coefficient (PTC) device to the diode on the positive and negative output sides, the safety for the reverse connection can be eliminated. When a charger is reversely connected to the power supply device, the spike absorption circuit cuts off or decreases an overcurrent by causing the fuse blowout or the PTC device to trip with an overcurrent flowing through the diode. However, such spike absorption circuits have some disadvantages. A spike absorption circuit in which a fuse is connected in series to a diode may fail to protect a current shutdown switch from a kickback voltage after the fuse is blown out. A spike absorption circuit in which a PTC device is connected to a diode may have difficulty effectively suppressing an avalanche breakage of a current shutdown switch due to a kickback voltage, because electric resistance of the PTC device increases after the PTC device has tripped.

The present invention has been developed for addressing conventional disadvantages as described above. An important object of the present invention is to provide a highly safe power supply device that reliably suppresses an avalanche breakage of a current shutdown switch due to a kickback voltage and also suppresses an overcurrent when a charger is reversely connected to the power supply device.

A power supply device of the present invention includes a plurality of secondary batteries; a current shutdown switch, formed of a semiconductor element, connected to an output side of the secondary batteries; a control circuit that controls turn-on and turn-off of the current shutdown switch; a spike absorption circuit, which is connected to an output side of the secondary batteries and the current shutdown switch, and includes a series circuit of a protection switch, formed of a semiconductor element, and a diode; a small-signal switch that controls turn-on and turn-off of the protection switch; and a delay circuit that maintains the small-signal switch in an ON state over a predetermined setup time (T) after a current shutdown timing has come, the current shutdown timing being a timing when the current shutdown switch is switched to the OFF state. The diode is connected, in a reverse direction, between the positive output side and the negative output side of the secondary batteries. The delay circuit maintains the small-signal switch in the ON state over the setup time (T) after the current shutdown timing of the current shutdown switch, and the small-signal switch in the ON state causes the protection switch to be switched to an ON state. The spike absorption circuit thereby damps a kickback voltage appearing in response to the cut-off of a current.

The power supply device described above is characterized as being able to reliably suppress an avalanche breakage of the current shutdown switch, formed of a semiconductor element, due to a kickback voltage exceeding a maximum rated voltage which may appear in response to the cut-off of a load current. More specifically, under a usage condition that an output line of the above power supply device is connected to a long wire containing great inductance or that a considerably large current is to be cut off, when the current shutdown switch is switched to the OFF state to cut off a current, a high kickback voltage appears. Even in this state, the power supply device is characterized as being able to reliably suppress an avalanche breakage of the current shutdown switch, formed of a semiconductor element, due to the kickback voltage.

The phenomenon in which, a kickback voltage momentarily appears in a power supply device connected to an inductive load in response to the cut-off of a current is attributed to current energy (E) accumulated inductance of the inductive load until the current is cut off. The current energy accumulated in the inductive load is dissipated by discharging the kickback voltage.

Current energy (E) accumulated in inductance (L) until the current flowing through the inductive load is cut off increases in proportional to the product of the square of the current flowing through a load and the inductance, as expressed in the following formula:

$$E = \frac{1}{2}(L \times I2),$$

where L denotes inductance of the inductive load connected to the load, and I denotes the current at a time of cut-off.

The inductance of the load connected to the power supply device is not limited to an inductive load of the load itself, such as a motor or a coil. Inductance contained in a wire may be added. Since a longer wire contains greater inductance, the inductance of the wire may be non-negligible if the power supply device is connected to the load via a long wire. In some applications, especially a high-power power supply device is connected to a load via a long wire. The inductance of this long wire may cause a high kickback voltage. It is thus very important for power supply devices intended to be used in various applications to reliably suppress an avalanche breakage of a current shutdown switch due to a kickback voltage.

The power supply device described above sets the protection switch in the spike absorption circuit to an ON state at a timing when a kickback voltage appears, thereby suppressing an avalanche breakage of the protection switch due to the kickback voltage. In this power supply device, the delay circuit maintains the small-signal switch in the ON state over a period between the moment when the current shutdown switch is switched to the OFF state to cut off the current and when the setup time (T) has passed. The small-signal switch in the ON state causes the protection switch to be switched to the ON state. The spike absorption circuit with the protection switch in the ON state thereby causes kickback energy to flow via the diode as current energy, thereby promptly damping the kickback energy. When the kickback voltage is discharged with the protection switch set to the ON state, a voltage generated across the diode, namely, a voltage drop in the diode in the forward direction is as extremely low as approximately 0.6 V. Even if two diodes are interconnected in series, the total voltage drop in the diodes is only 1.2 V. The voltage across the spike absorption circuit is therefore limited to 1.2 V when the protection switch is in the ON state. In short, when the protection switch is in the ON state, an extremely low spike voltage appears between output terminals, and this spike voltage is less likely to cause an avalanche breakage of the current shutdown switch in the OFF state. The spike voltage is short-circuited via the diodes and damped. The spike voltage is thereby damped promptly.

In the power supply device described above, the current shutdown switch is switched to the OFF state, and then the current shutdown switch is switched to the ON state only over a predetermined period. After that, the current shutdown switch is switched to the OFF state. In a normal usage state, the protection switch is thus maintained in the OFF state. If a charger is reversely connected to the power supply device with the protection switch in the OFF state, the protection switch in the OFF state blocks a current from flowing through the diode. In this way, the power supply device successfully suppresses an occurrence of a disadvantage in which an overcurrent flows through the diode when a charger is reversely connected to the power supply device. In the spike absorption circuit, the protection switch, formed of a semiconductor element, is used as an element connected in series to the diode, instead of a fuse or a PTC. This spike absorption circuit successfully suppresses an avalanche breakage due to a kickback voltage and also successfully and reliably suppresses an avalanche breakage even when a charger is repeatedly reversely connected to the power supply device. When a charger is reversely connected to the power supply device having a conventional spike absorption circuit in which a diode is connected in series to a fuse, this fuse is blow out, after which the spike absorption circuit can no longer suppress an avalanche breakage. If a PTC trips, its electric resistance increases to lower safety. The power supply device described above realizes characteristics of suppressing an avalanche breakage of the current shutdown switch due to a kickback voltage and achieving safety when a charger is reversely connected to the power supply device.

The power supply device of the present invention can cause the current shutdown switch to operate as a discharge switch that suppresses over-discharge of the secondary batteries. This power supply device is characterized as being able to detect a remaining capacity of the secondary batteries with the control circuit and, when the secondary batteries are over-discharged, to switch the discharge switch to the OFF state, thereby suppressing the over-discharge of the secondary batteries.

In the power supply device of the present invention, a discharge (charge) switch that suppresses over-discharge (overcharge) of a battery is connected to the output side of an overcurrent shutdown switch. The spike absorption circuit connected to the output side of the discharge switch thereby can be connected to the node between the current shutdown switch and the discharge (charge) switch.

In the power supply device of the present invention, each of the current shutdown switch, the charge switch, and the protection switch may be a field effect transistor (FET). In the power supply device of the present invention, a voltage regulation diode may be connected to the input side of the protection switch.

DESCRIPTION OF EMBODIMENT

Some exemplary embodiments of the present invention have been described with reference to the accompanying drawings. However, exemplary embodiments described below exemplify a power supply device that embodies the technical ideas of the present invention. The power supply device of the present invention is not limited to the following.

In the present description, in order to easily understand the scope of claims, the corresponding numbers to members shown in the exemplary embodiments and the examples are added to members shown in the scope of claims and solution of problem. In the present description, members shown in the scope of claims are not limited to the members of the exemplary embodiments and the examples.

Figure 1:
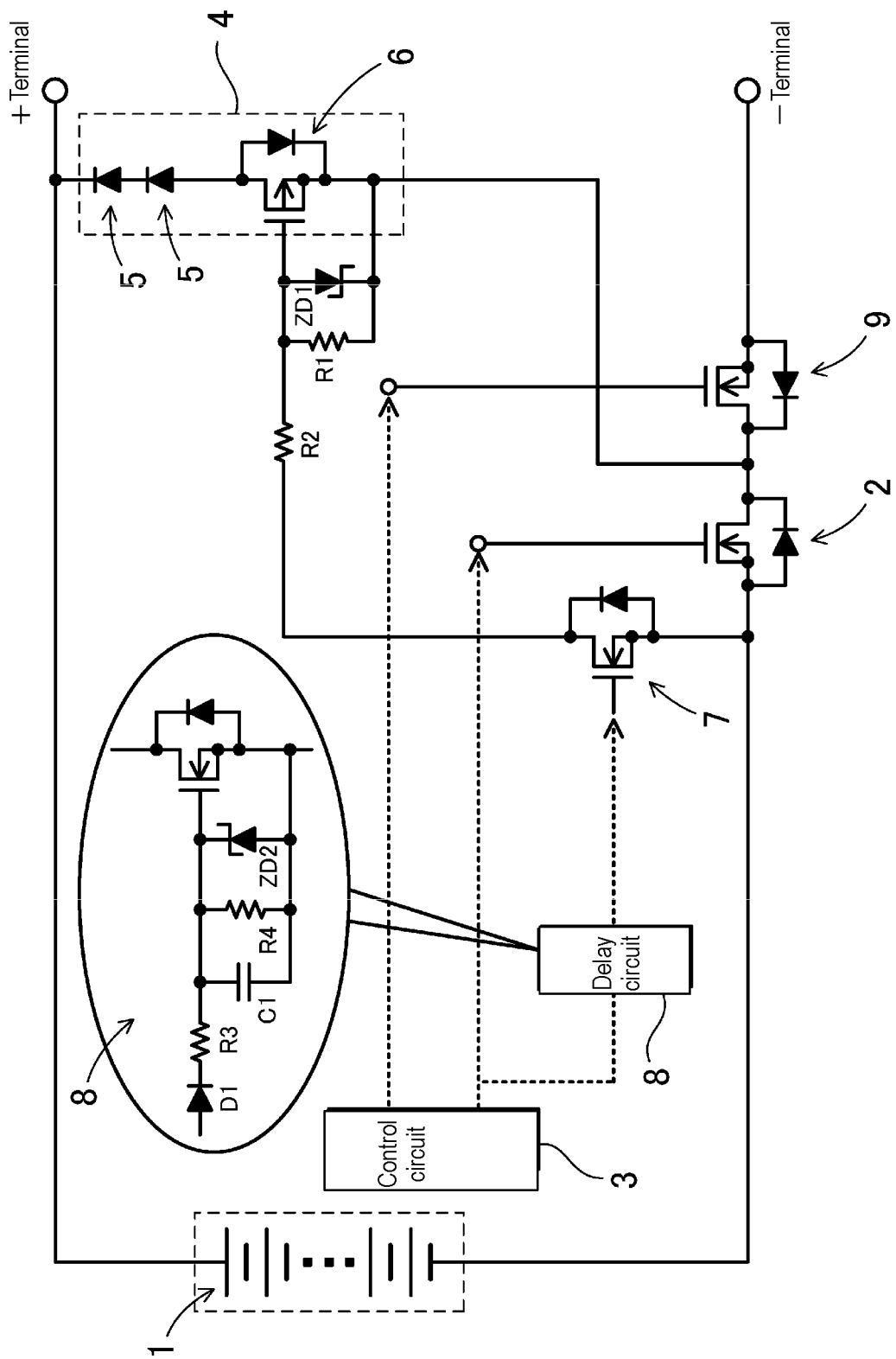
FIG. 1 is a circuit diagram of a power supply device according to an exemplary embodiment of the present invention.

A power supply device illustrated in FIG. 1 includes a plurality of secondary batteries 1; current shutdown switch 2, which is formed of a semiconductor element, connected to an output side of secondary batteries 1; control circuit 3 that controls turn-on and turn-off of current shutdown switch 2; spike absorption circuit 4 that is present on output sides of both secondary batteries 1 and current shutdown switch 2 and is connected to an output side of the power supply device; small-signal switch 7 that controls turn-on and turn-off of protection switch 6 in spike absorption circuit 4; delay circuit 8 that maintains small-signal switch 7 in an ON state over predetermined setup time (T) after a current shutdown timing has come, the current shutdown timing being a timing when current shutdown switch 2 is switched to an OFF state.

The plurality of secondary batteries 1 are interconnected in series in order to output a high voltage. A high-power power supply device has many secondary batteries 1 interconnected in series in order to output a high voltage. Another power supply device has a plurality of secondary batteries 1 interconnected in parallel in order to provide a high capacity of outputting a current or a high charge or discharge capacity. The high-power power supply device supplies a large current to a load. When this current is cut off, a high spike voltage momentarily appears. This high spike voltage may cause an avalanche breakage of a discharge switch, such as a field effect transistor (FET), connected as a protection element. The power supply device of the present invention is characterized as being able to effectively suppress an avalanche breakage of a semiconductor element due to a spike voltage. The power supply device of the present invention is thus suitable for devices that supply a large amount of electric power to a load, more specifically, power supply devices, for example, having a capacity of 1 kWh or more, in which many secondary batteries are interconnected in series or in parallel.

The power supply device of the present invention is, however, not limited to a large-capacity device. Even in a small-capacity power supply device, when a discharge switch connected to an inductive load is switched to the OFF state, a high spike voltage may also appear due to inductance of the inductive load and may cause an avalanche breakage of the discharge switch, such as a FET.

In the power supply device of FIG. 1, current shutdown switch 2 that cuts off a load current is connected in series to charge switch 9. Charge switch 9 suppresses or prevents overcharge of secondary batteries 1. Current shutdown switch 2 is a discharge switch that suppresses or prevents over-discharge of secondary batteries 1. Each of current shutdown switch 2 acting as a discharge switch and charge switch 9 may be a semiconductor switching element. In the illustrated power supply device, the semiconductor switching element of each of current shutdown switch 2 acting as a discharge switch and charge switch 9 is a metal oxide semiconductor field effect transistor (MOSFET). Two sets of MOSFETs are interconnected in series and connected between secondary batteries 1 and the output terminal to suppress overcharge and over-discharge of secondary batteries 1. Such MOSFETs are semiconductor elements that can control a large current. More specifically, MOSFETs in the ON state are characterized as providing a low power loss, because a MOSFET in an ON state causes a lower voltage drop than a transistor in an ON state. However, each of current shutdown switch 2 and charge switch 9 in the power supply device of the present invention is not limited to a MOSFET. Alternatively, each of current shutdown switch 2 and charge switch 9 may be a transistor, an insulated gate bipolar transistor (IGBT), and other semiconductor elements.

Control circuit 3 controls turn-on and turn-off of each of charge switch 9 and current shutdown switch 2 used as a discharge switch that suppresses over-discharge of the secondary batteries. Control circuit 3 also controls turn-on and turn-off of protection switch 6 in spike absorption circuit 4 via delay circuit 8. When secondary batteries 1 are neither charged nor discharged, control circuit 3 switches both current shutdown switch 2 and charge switch 9 to the OFF state. When secondary batteries 1 are either charged or discharged, control circuit 3 switches both current shutdown switch 2 and charge switch 9 to the ON state. Moreover, when detecting a short circuit of a load or an overcurrent flowing through the load, control circuit 3 switches current shutdown switch 2 to the OFF state. After detecting full charge of secondary batteries 1, control circuit 3 switches charge switch 9 to the OFF state.

Spike absorption circuit 4 is a series circuit of protection switch 6, formed of a semiconductor element, and diodes 5. Each of diodes 5 is connected in the reverse direction with respect to a voltage between the positive and negative terminals of secondary batteries 1. Protection switch 6 is a MOSFET. Protection switch 6, however, may also be any semiconductor switching element, such as a transistor or an IGBT, instead of an FET. Spike absorption circuit 4 suppresses a kickback voltage appearing at the moment when a discharge switch, or current shutdown switch 2, is switched to the OFF state to cut off the load current. A kickback voltage appearing at the moment when a current flowing through an inductive load is cut off is proportional to inductance of the inductive load and a variation rate of the current. This kickback voltage is applied across a semiconductor element at the moment when the discharge switch is switched to the OFF state. If the kickback voltage exceeds a maximum rated voltage of the semiconductor element, an avalanche breakage occurs in the semiconductor element. Protection switch 6 in spike absorption circuit 4 is maintained in the ON state over setup time (T) after the current shutdown timing when the load current is cut off. Then, protection switch 6 in the ON state absorbs the kickback voltage by short-circuiting this kickback voltage with diodes 5. The kickback voltage applied in the reverse direction between the positive and negative terminals is short-circuited via diodes 5 connected in the reverse direction between the output terminals.

The gate of the MOSFET in protection switch 6 is connected to small-signal switch 7 via voltage dividing resistors (R1, R2). Connected between the gate and source of the MOSFET in protection switch 6 is voltage regulation diode ZD1. Voltage regulation diode ZD1 limits a voltage to be applied to the gate of the MOSFET acting as protection switch 6 to a preset voltage. Voltage dividing resistors (R1, R2) decrease a voltage to be applied between the gate and source of protection switch 6 by R1/(R1+R2) times. Then, voltage regulation diode ZD1 limits the decreased voltage to the preset voltage, which is subsequently applied to the gate of protection switch 6. Protection switch 6 is maintained in the ON state when receiving an ON voltage at the gate from small-signal switch 7 in the ON state, over setup time (T) after the current shutdown timing, at which current shutdown switch 2 is switched to the OFF state to cut off the load current. In this way, protection switch 6 absorbs the kickback voltage over setup time (T).

Protection switch 6 in spike absorption circuit 4 is not always maintained in the ON state. Protection switch 6 needs to prevent an overcurrent from flowing through diodes 5 when a charger is reversely connected between the output terminals of the power supply device. Protection switch 6 is therefore maintained in the ON state only over setup time (T) after the current shutdown timing, and then switched to the OFF state by small-signal switch 7.

Small-signal switch 7 controls the turn-on and turn-off of protection switch 6 in response to a signal from delay circuit 8. When switched to the ON state, small-signal switch 7 supplies an ON signal to protection switch 6. Even when small-signal switch 7 is switched to the ON state, however, protection switch 6 is maintained in the OFF state as long as current shutdown switch 2 is the ON state. More specifically, current shutdown switch 2 in the ON state connects the gate and source of protection switch 6, thereby setting the voltage at the gate to 0 V.

Small-signal switch 7 in the ON state connects the gate of the FET acting as protection switch 6 to the negative side of secondary batteries 1. Then, when the FET acting as current shutdown switch 2 is switched to the OFF state, an ON voltage between the source and drain of current shutdown switch 2 is applied between the drain and gate of the FET acting as protection switch 6, thereby setting protection switch 6 to the ON state. This is because the kickback voltage is applied between the source and drain of current shutdown switch 2. In short, protection switch 6 is set to the ON state when small-signal switch 7 is in the ON state and current shutdown switch 2 is in the OFF state.

Over setup time (T) after the current shutdown timing, at which current shutdown switch 2 is switched to the OFF state, delay circuit 8 maintains protection switch 6 in the ON state via small-signal switch 7. After setup time (T) has passed, delay circuit 8 switches protection switch 6 to the OFF state. Delay circuit 8 includes input diode D1 connected to the input line; input resistor R3 connected in series to input diode D1; a parallel circuit of timing capacitor C1 and timing resistor RA determines a time constant that controls setup time (T); and voltage regulation diode ZD2 connected in parallel to the parallel circuit. Voltage regulation diode ZD2 is connected between the gate and source of the FET acting as small-signal switch 7.

The time constant determined by timing capacitor C1 and timing resistor RA controls setup time (T). More specifically, the time constant determined by the product of a capacitance of timing capacitor C1 and a resistance value of timing resistor RA controls setup time (T) of delay circuit 8. Setting the time constant to a larger value makes setup time (T) longer, whereas setting the time constant to a smaller value makes setup time (T) shorter. The time constant determined by timing capacitor C1 and timing resistor RA may be set based on the damping time of a kickback voltage. For example, the time constant is set in the range from 200 µs to 10 ms, inclusive, preferably from 500 µs to 3 ms, inclusive, and more specifically from 500 µs to 2 ms, inclusive.

Delay circuit 8 controls the turn-on and turn-off of small-signal switch 7 in response to a control signal from control circuit 3. In the illustrated power supply device, a signal supplied to current shutdown switch 2 is also supplied to delay circuit 8 as the control signal. This control signal is a signal that becomes "High" when current shutdown switch 2 is switched to the ON state and becomes "Low" when current shutdown switch 2 is switched to the OFF state. When the "High" signal is supplied to delay circuit 8, timing capacitor C1 that determines the time constant via input diode D1 and input resistor R3 is charged, whereby small-signal switch 7 is switched to the ON state. When current shutdown switch 2 is switched to the OFF state and an input signal for an arithmetic circuit is thereby switched from the "High" to "Low", timing capacitor C1 is gradually discharged via timing resistor RA. After setup time (T) has passed, small-signal switch 7 is switched to the OFF state.

When the power supply device is in a normal usage state, current shutdown switch 2 is in the ON state in order to supply electric power to the load. The "High" signal supplied to current shutdown switch 2 in this state is also supplied to delay circuit 8, thereby switching small-signal switch 7 to the ON state. Even when small-signal switch 7 is switched to the ON state, current shutdown switch 2 in the ON state short-circuits the gate and source of protection switch 6, thereby maintaining protection switch 6 in the OFF state. In short, when the power supply device is in the normal usage state, protection switch 6 is maintained in the OFF state.

When current shutdown switch 2 is switched to the OFF state, delay circuit 8 supplies an ON signal to small-signal switch 7 over setup time (T), thereby maintaining small-signal switch 7 in the ON signal over setup time (T). Then, when the load current is cut off in response to the switching of current shutdown switch 2 to the OFF state, current shutdown switch 2 disconnects the gate from the source of protection switch 6, and an ON signal is thereby supplied to the gate of protection switch 6 via voltage dividing resistors (R1, R2). In short, after the current shutdown timing, at which current shutdown switch 2 is switched to the OFF state, comes, protection switch 6 is maintained in the ON state until setup time (T) has passed. Protection switch 6 in the ON state short-circuits a kickback voltage via diodes 5, thereby suppressing an avalanche breakage of current shutdown switch 2 due to the kickback voltage. The kickback voltage that has appeared at the moment when the load current is cut off is short-circuited by diodes 5 and damped or attenuated promptly. Setup time (T) for delay circuit 8 is set based on a time in which the kickback voltage becomes extinct. After setup time (T) has passed, delay circuit 8 switches small-signal switch 7 to the OFF state, thereby switching protection switch 6 to the OFF state. After the kickback voltage is damped, spike absorption circuit 4 switches protection switch 6 to the OFF state. Protection switch 6 that has been switched to the OFF state prevents an overcurrent from flowing through diodes 5 when a charger is reversely connected to the output terminals of the power supply device.

The power supply device described above suppresses an avalanche breakage of a current shutdown switch due to a kickback voltage that may appear at the moment when current shutdown switch 2 is switched to the OFF state and also suppresses a disadvantage that may arise when a charger is reversely connected between the output terminals of the power supply device. This power supply device operates in a manner that will be described below.

1. State where Secondary Batteries are Neither Charged Nor Discharged

In this state, control circuit 3 sets current shutdown switch 2, charge switch 9, and small-signal switch 7 to the OFF state. Although control circuit 3 supplies a "Low" signal to current shutdown switch 2, this "Low" signal is also supplied to small-signal switch 7 via delay circuit 8. In response, small-signal switch 7 is switched to the OFF state. Small-signal switch 7 in the OFF state causes protection switch 6 in spike absorption circuit 4 to be switched to the OFF state.

If the output terminals are short-circuited in this state, secondary batteries 1 are not discharged, because current shutdown switch 2 is in the OFF state. If a charger is connected to the power supply device, a charge current does not flow, because current shutdown switch 2 is in the OFF state. If a charger is reversely connected to the power supply device, protection switch 6 in the OFF state blocks a current from flowing through diodes 5 in spike absorption circuit 4.

2. State where Secondary Batteries are Either Charged or Discharged

In this state, control circuit 3 sets current shutdown switch 2 in current shutdown switch 2, charge switch 9, and small-signal switch 7 to the ON state. Small-signal switch 7 receives a "High" signal that control circuit 3 supplies to current shutdown switch 2, via delay circuit 8. In response, small-signal switch 7 is switched to the ON state. As a result, small-signal switch 7 is set to the ON state, but protection switch 6 is maintained in the OFF state, because current shutdown switch 2 in the ON state short-circuits the gate and source of protection switch 6 to block an ON signal from being supplied to the gate of protection switch 6.

3. State where Output Terminals are Short-Circuited when Both Current Shutdown Switch and Charge Switch are in ON State When the output terminals of the power supply device are short-circuited, control circuit 3 detects a short-circuit current and then causes current shutdown switch 2 to be switched to the OFF state. Current shutdown switch 2 that has been switched to the OFF state cuts off the load current. A kickback voltage thereby appears between the output terminals. This kickback voltage feeds a current in the direction indicated by the arrow in FIG. 2. As a result, a voltage is generated across current shutdown switch 2, more specifically between the drain and source of the FET acting as current shutdown switch 2. This voltage causes protection switch 6 in spike absorption circuit 4 to be switched to the ON state. In this state, small-signal switch 7 in the ON state applies a voltage to the gate of the FET acting as protection switch 6. This voltage is limited to a preset voltage by voltage regulation diode ZD1 connected on the input side. The FET in protection switch 6 is thereby switched to the ON state. In short, at the moment when the FET acting as protection switch 6 is switched to the OFF state, protection switch 6 is switched to the ON state.

Since protection switch 6 in the ON state is switched to the ON state at the moment when the load current is cut off, a kickback voltage appearing at the moment when the current is cut off is short-circuited by diodes 5 via protection switch 6. This operation prevents the kickback voltage from increasing to cause an avalanche breakage of the FET acting as current shutdown switch 2 that has been switched to the OFF state.

4. State where Output Terminals are Short-Circuited to Damp Kickback Voltage

After protection switch 6 has been switched to the ON state, the kickback voltage is damped as setup time (T) for delay circuit 8 passes. Then, small-signal switch 7 is switched to the OFF state, whereby protection switch 6 is also switched to the OFF state. In response to the "Low" signal from delay circuit 8, small-signal switch 7 is switched to the OFF state. When setup time (T) passes after current shutdown switch 2 has been switched to the OFF state, delay circuit 8 switches its output from the "High" signal to the "Low" signal, thereby causing small-signal switch 7 to be switched to the OFF state.

At the moment when current shutdown switch 2 is switched to the OFF state, control circuit 3 switches a signal input to delay circuit 8 in FIG. 1 from the "High" signal to the "Low" signal. When the input signal is switched from the "High" signal to the "Low" signal, timing capacitor C1 in delay circuit 8 that has been charged with the "High" signal is discharged via timing resistor RA. As setup time (T) passes, timing capacitor C1 is discharged, and delay circuit 8 switches its output from the "High" signal to the "Low" signal. In response to the "Low" signal from delay circuit 8, small-signal switch 7 is switched to the OFF state. Small-signal switch 7 in the OFF state blocks a voltage applied to the gate of the FET acting as protection switch 6, thereby causing the FET acting as protection switch 6 to be the OFF state. In short, when setup time (T) for delay circuit 8 passes, small-signal switch 7 is switched to the OFF state. Then, small-signal switch 7 in the OFF state switches protection switch 6 to the OFF state. This state is illustrated in FIG. 3.

Figure 3:
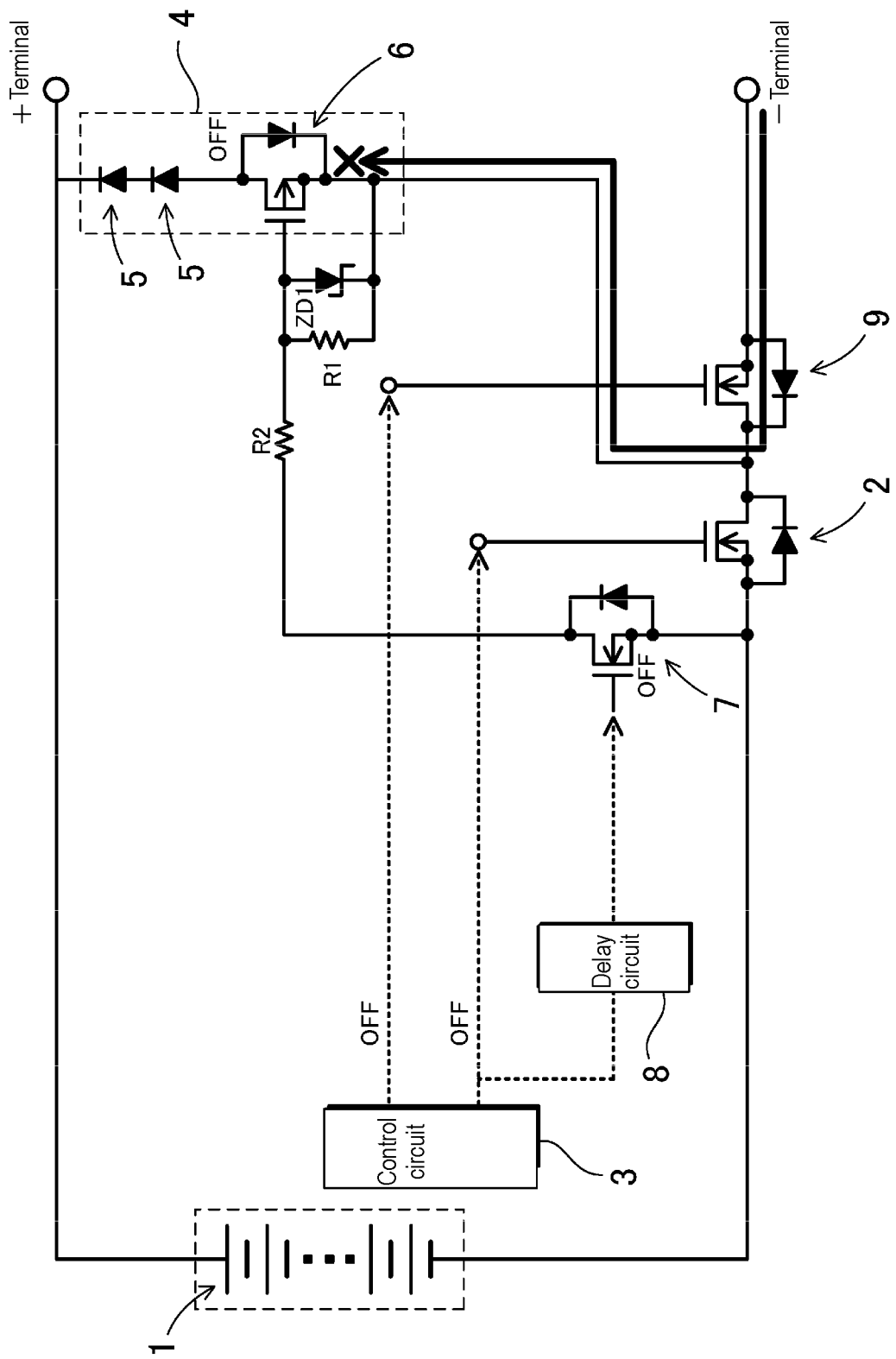
FIG. 3 is a circuit diagram in a current conduction state of the power supply device illustrated in FIG. 1 when a charger is reversely connected to the power supply device.

Even if a charger is reversely connected to the output side of the power supply device in the illustrated state, protection switch 6 in the OFF state blocks an overcurrent from flowing through diodes 5 in spike absorption circuit 4, as illustrated in FIG. 3.

INDUSTRIAL APPLICABILITY

The power supply device of the present invention can be safely and efficiently used as a high-power device to which a long wire or an inductive load is to be connected.

BRIEF DESCRIPTION OF DRAWINGS

FIG. 1 is a circuit diagram of a power supply device according to an exemplary embodiment of the present invention.

Figure 2:
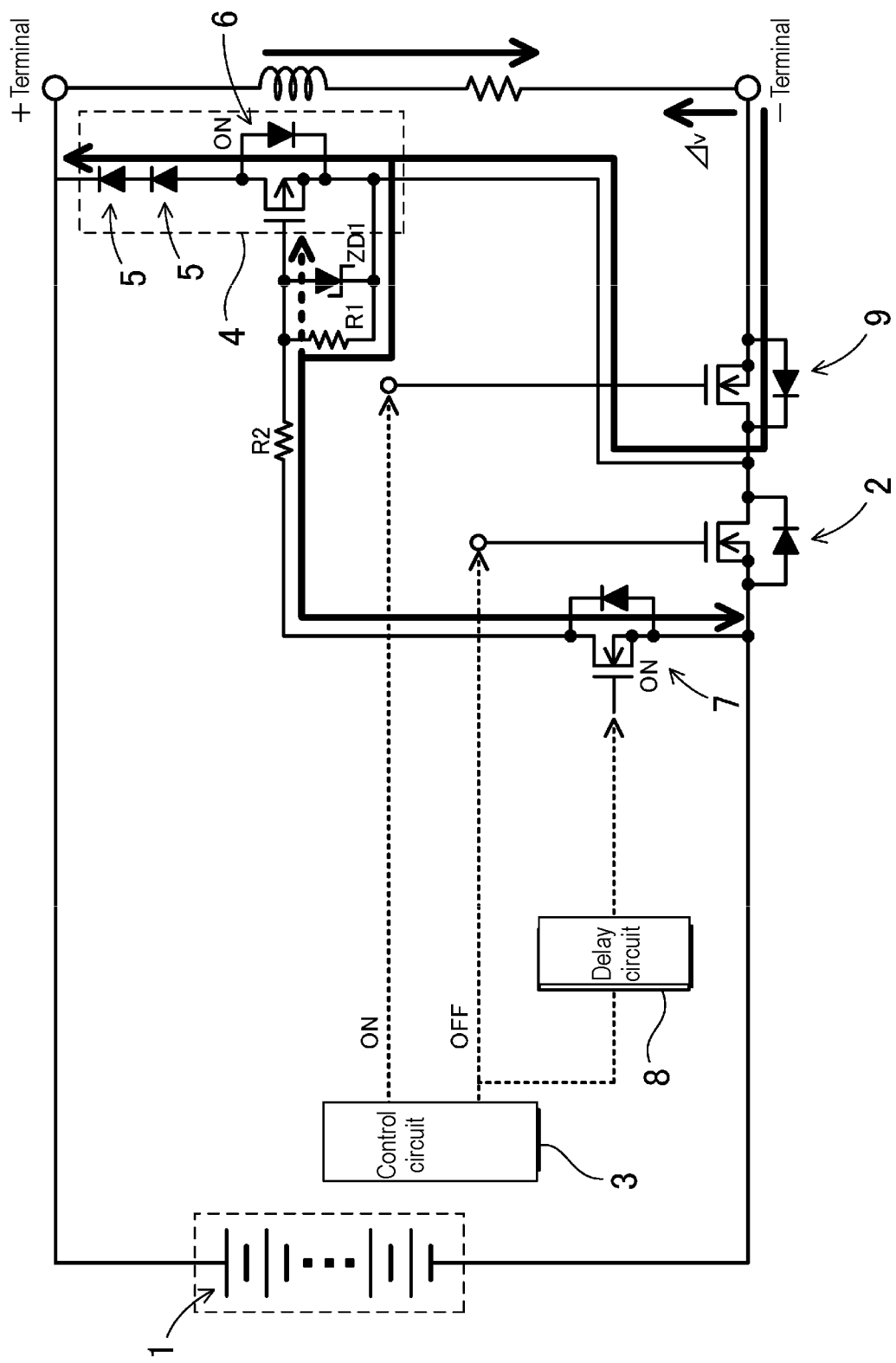
FIG. 2 is a circuit diagram in a current conduction state of the power supply device illustrated in FIG. 1 when the power supply device absorbs a kickback voltage.

FIG. 2 is a circuit diagram in a current conduction state of the power supply device illustrated in FIG. 1 when the power supply device absorbs a kickback voltage.

FIG. 3 is a circuit diagram in a current conduction state of the power supply device illustrated in FIG. 1 when a charger is reversely connected to the power supply device.

REFERENCE MARKS IN THE DRAWINGS 1 secondary batteries
2 current shutdown switch
3 control circuit
4 spike absorption circuit
5 diode
6 protection switch
7 small-signal switch
8 delay circuit
9 charge switch

The invention claimed is:

1. A power supply device comprising:
a plurality of secondary batteries;
a current shutdown switch connected to an output side of the secondary batteries, the current shutdown switch being formed of a semiconductor element;
a control circuit that controls turn-on and turn-off of the current shutdown switch;
a spike absorption circuit connected between a positive output side and a negative output side on a further output side from the secondary batteries and the current shutdown switch, the spike absorption circuit including a series circuit of a protection switch and a diode, the protection switch being formed of a semiconductor element;
a small-signal switch that controls turn-on and turn-off of the protection switch; and
a delay circuit that maintains the small-signal switch in an ON state over a predetermined setup time after a current shutdown timing has come, the current shutdown timing being a timing when the current shutdown switch is switched to an OFF state,
wherein
the diode is connected, in a reverse direction, between the positive output side and the negative output side of the secondary batteries, and
the delay circuit maintains the small-signal switch in the ON state over the setup time after the current shutdown timing of the current shutdown switch, the small-signal switch in the ON state causes the protection switch to be switched to an ON state, and the spike absorption circuit damps a kickback voltage.

2. The power supply device according to claim 1, wherein the current shutdown switch is a discharge switch that prevents over-discharge of the secondary batteries.

3. The power supply device according to claim 1, further comprising a charge switch that prevents overcharge of a battery, the charge switch being connected to an output side of the current shutdown switch,
wherein
the spike absorption circuit connected to an output side of the charge switch is connected to a node between the current shutdown switch and the charge switch.

4. The power supply device according to claim 3, wherein each of the current shutdown switch, the charge switch, and the protection switch is an FET.

5. The power supply device according to claim 1, further comprising a voltage regulation diode that limits a voltage to be applied to the protection switch via the charge switch in an ON state to a preset voltage, the voltage regulation diode being connected to an input side of the protection switch.

6. The power supply device according to claim 2, further comprising a charge switch that prevents overcharge of a battery, the charge switch being connected to an output side of the current shutdown switch,
wherein
the spike absorption circuit connected to an output side of the charge switch is connected to a node between the current shutdown switch and the charge switch.

7. The power supply device according to claim 2, further comprising a voltage regulation diode that limits a voltage to be applied to the protection switch via the charge switch in an ON state to a preset voltage, the voltage regulation diode being connected to an input side of the protection switch.

8. The power supply device according to claim 3, further comprising a voltage regulation diode that limits a voltage to be applied to the protection switch via the charge switch in an ON state to a preset voltage, the voltage regulation diode being connected to an input side of the protection switch.

9. The power supply device according to claim 4, further comprising a voltage regulation diode that limits a voltage to be applied to the protection switch via the charge switch in an ON state to a preset voltage, the voltage regulation diode being connected to an input side of the protection switch.

* * * * *